(12) United States Patent
Narayanan et al.

(10) Patent No.: US 7,585,577 B2
(45) Date of Patent: Sep. 8, 2009

(54) MONOPOLAR FUEL CELL STACK COUPLED TOGETHER WITHOUT USE OF TOP OR BOTTOM COVER PLATES OR TIE RODS

(75) Inventors: Sekharipuram R. Narayanan, Arcadia, CA (US); Thomas I. Valdez, Covina, CA (US)

(73) Assignee: California Institute of Technology, Pasadena, CA (US)

( * ) Notice: Subject to any disclaimer, the term of this patent is extended or adjusted under 35 U.S.C. 154(b) by 1439 days.

(21) Appl. No.: 10/410,761

(22) Filed: Apr. 9, 2003

(65) Prior Publication Data

US 2004/0001992 A1    Jan. 1, 2004

Related U.S. Application Data

(60) Provisional application No. 60/371,053, filed on Apr. 9, 2002.

(51) Int. Cl.
*H01M 8/24* (2006.01)
(52) U.S. Cl. ........................................................ 429/12
(58) Field of Classification Search ............. 429/34–40, 429/12
See application file for complete search history.

(56) References Cited

U.S. PATENT DOCUMENTS

| | | | |
|---|---|---|---|
| 3,589,941 A * | 6/1971 | Eaton et al. | 429/22 |
| 5,709,961 A | 1/1998 | Cisar et al. | |
| 5,945,232 A | 8/1999 | Ernst et al. | |
| 6,066,408 A | 5/2000 | Vitale et al. | |
| 6,194,095 B1 * | 2/2001 | Hockaday | 429/34 |

* cited by examiner

*Primary Examiner*—Mark Ruthkosky
(74) *Attorney, Agent, or Firm*—Daniel L. Dawes (57) ABSTRACT

A monopolar fuel cell stack comprises a plurality of sealed unit cells coupled together. Each unit cell comprises two outer cathodes adjacent to corresponding membrane electrode assemblies and a center anode plate. An inlet and outlet manifold are coupled to the anode plate and communicate with a channel therein. Fuel flows from the inlet manifold through the channel in contact with the anode plate and flows out through the outlet manifold. The inlet and outlet manifolds are arranged to couple to the inlet and outlet manifolds respectively of an adjacent one of the plurality of unit cells to permit fuel flow in common into all of the inlet manifolds of the plurality of the unit cells when coupled together in a stack and out of all of the outlet manifolds of the plurality of unit cells when coupled together in a stack.

7 Claims, 5 Drawing Sheets

METHANOL IN   FIG. 1   METHANOL OUT

METHANOL IN   FIG. 2   METHANOL OUT

MONOPOLAR FUEL CELL STACK COUPLED TOGETHER WITHOUT USE OF TOP OR BOTTOM COVER PLATES OR TIE RODS

RELATED APPLICATIONS

The present application is related to U.S. Provisional Patent Application Ser. No. 60/371,053, filed on Apr. 9, 2002, which is incorporated herein by reference and to which priority is claimed pursuant to 35 USC 119.

GOVERNMENT INTERESTS

The invention described herein was made in the performance of work under a NASA contract, and is subject to the provisions of Public Law 96-517 (35 U.S.C. §202) in which the Contractor has elected to retain title.

BACKGROUND OF THE INVENTION

1. Field of the Invention

The invention relates to fuel cells, and in particular to monopolar fuel stacks.

2. Description of the Prior Art

Although there are five primary types of fuel cells, one of the most common types is the polymer electrolyte membrane (PEM) fuel cell. A PEM fuel cell consists of several membrane electrode assemblies (MEAs) within gas diffusion layers and bipolar plates. The purpose of a fuel cell is to produce an electrical current. The chemical reactions that produce this current cause the fuel cell to function. In general terms, hydrogen atoms enter a fuel cell at the anode where a chemical reaction strips them of their electrons. The hydrogen atoms are now "ionized" and carry a positive electrical charge. In some cell types oxygen enters the fuel cell at the cathode and combines with electrons returning from the electrical circuit and hydrogen ions traveling though the electrolyte from the anode. In other cell types the oxygen picks up electrons and then travels through the electrolyte to the anode where it combines with hydrogen ions. Regardless of whether oxygen and hydrogen combine at the anode or cathode, together they form water, which drains from the cell. As long as a fuel cell is supplied with hydrogen and oxygen it will generate electricity.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

Currently stacks are fabricated with bipolar stacks where the majority of the mass is associated with a bipolar plates that serve to electrically connect cells and distribute the fuel and oxidant. This type of design a "bipolar plate" serves as a repeating element that serves to interconnect the cells and distribute the reactants. Such a bipolar stack is held together under pressure by "end plates" to ensure good contact and sealing. A typical stack would have two or more bipolar plates. The bipolar plates are usually fabricated from graphite composites while the end plates are made from titanium, stainless steel or aluminum. Several tie rods usually run across the stack to hold the plates together. The bipolar stack has the advantage of providing a very low internal resistance which is crucial for minimizing the losses for large currents that may flow through these stacks, and which is especially necessary for stacks which output more than a few tens of watts.

However, when the power output is only a few watts, the very low internal resistance offered by the bipolar stack design is not absolutely necessary. Such bipolar plates and end plates are usually machined or molded with flow field from graphite composite and the typical cost $50-$100/sq. foot, and become a major part of the costs of the stack. Most importantly, the biplates, end plates and tie rods constitute about 80% of the weight of a typical stack thus lowering the power density of the stack. Also, once such as stack is assembled, trouble shooting will require the entire stack to be dismantled if any of the cells in the center of the stack has to be accessed.

Therefore, a new design that is substantially less expensive to fabricate, lighter, does not require extensive pressure to ensure sealing, that eliminates biplates and endplates totally, and is easy to manufacture and troubleshoot, is highly desirable for commercialization of fuel cells.

BRIEF SUMMARY OF THE INVENTION

A novel stack design is disclosed below that overcomes the limitations of the conventional bipolar fuel stacks bipolar fuel stacks is proposed. This new stack design offers a two-to-three fold improvement in power densities, suitable for manufacturing, uses inexpensive plastic materials, and straightforward to troubleshoot and assemble. Such a stack design will substantially improve the commercialization of portable direct methanol fuel cell power sources.

More particularly, the invention is a monopolar fuel cell stack comprising a plurality of sealed unit cells coupled together. Each unit cell comprises a first cathode, a first membrane electrode assembly disposed adjacent to the first cathode, and an anode plate disposed adjacent to the first membrane electrode assembly. The anode plate has an anode and an internal channel defined therein for flow of fuel through the anode plate. An inlet manifold is coupled to the anode plate and communicates with the channel within the anode plate. An outlet manifold is coupled to the anode plate and communicates with the channel within the anode plate. Fuel flows from the inlet manifold through the channel in contact with the anode plate and flows out through the outlet manifold. A second membrane electrode assembly is disposed adjacent to the anode plate. A second cathode is disposed adjacent to the second membrane. The inlet and outlet manifolds are arranged and configured to couple to the inlet and outlet manifolds respectively of an adjacent one of the plurality of unit cells to permit fuel flow in common into all of the inlet manifolds of the plurality of the unit cells when coupled together in a stack and out of all of the outlet manifolds of the plurality of unit cells when coupled together in a stack.

The first and second cathode are included as part of a corresponding first and second cathode plate. Each inlet and outlet manifold is configured to space each unit cell from each adjacent unit cell to provide an air gap between adjacent unit cells when the plurality of unit cells are coupled together to form the stack. At least the inlet and outlet manifolds are composed of plastic. Each of the inlet and outlet manifolds are arranged and configured to snap fit into adjacent inlet and outlet manifolds respectively to provide a common inlet and outlet manifold for the stack for the plurality of unit cells. The snap fit is a zip-lock coupling.

The stack may further comprise an inlet and outlet header coupled to the common inlet and outlet manifold for the stack for the plurality of unit cells and a current collector for electrically connecting the anodes of the anode plate with the cathodes in a predetermined connection topology. The stack may further comprise sealing gaskets between the first and second cathode plates on one hand and the first and second membrane electrode assemblies on the other, and further between the first and second membrane electrode assemblies on one hand and the anode plate on the other. In the illustrated embodiment the fuel flowing through the anode plate is liquid methanol.

The invention is also a method of fabricating a monopolar fuel cell stack comprising the steps of separately assembling a plurality of sealed unit cells, and snap fitting the plurality of sealed unit cells together to form the stack.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 2:
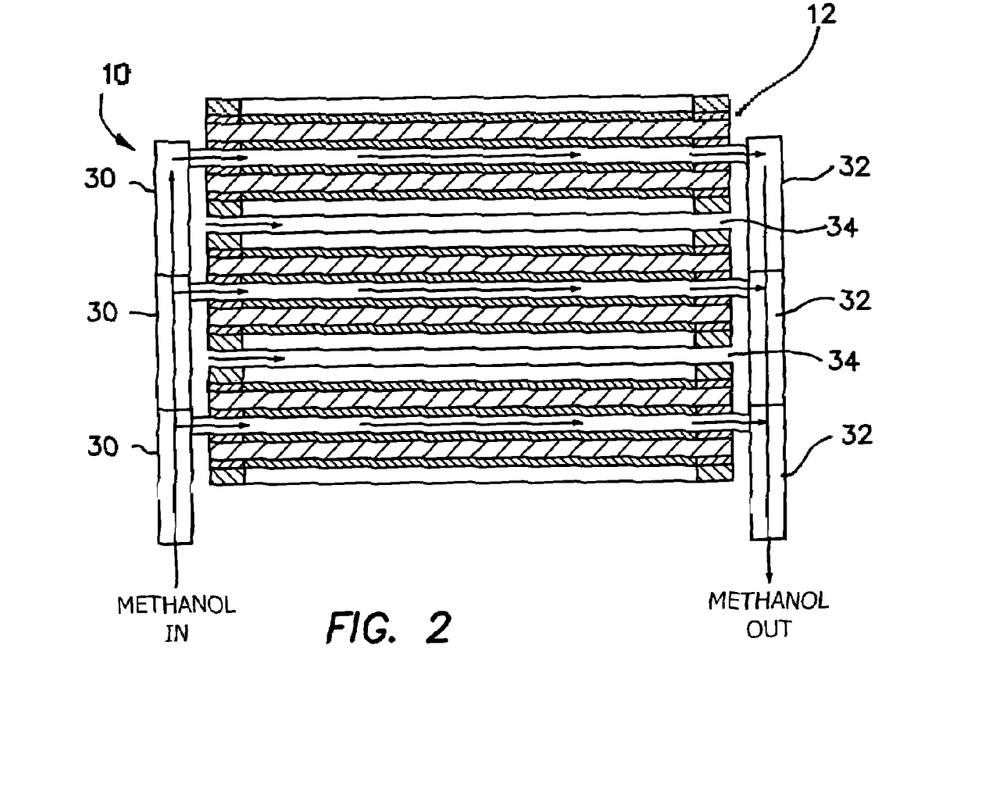
FIG. 2 is a cross-sectional side view of a three monopolar unit cells combined into a stack according to the invention.

The invention is a stack 10 as shown in cross-sectional side view in FIG. 2 used in a methanol fuel cell, although it could be used with other types of fuels as well. Such a methanol fuel cell is described in detail in Surampudi et.al., "*Direct Methanol Feed Fuel Cell and System*," U.S. Pat. No. 6,303,244 (2001), U.S. Pat. No. 5,599,638 (1997), and U.S. Pat. No. 6,485,851 (2002), each of which are incorporated herein by reference. The stack design of the invention offers a two-to-three fold improvement in power densities, suitable for manufacturing, uses inexpensive plastic materials, and is straightforward to troubleshoot and assemble. Such a stack design brings portable direct methanol fuel cell power sources one big step closer to commercialization. The design achieves the functions and performance of a conventional stack and has the potential to be just 30% of the weight of the conventional bipolar stack.

Figure 1:
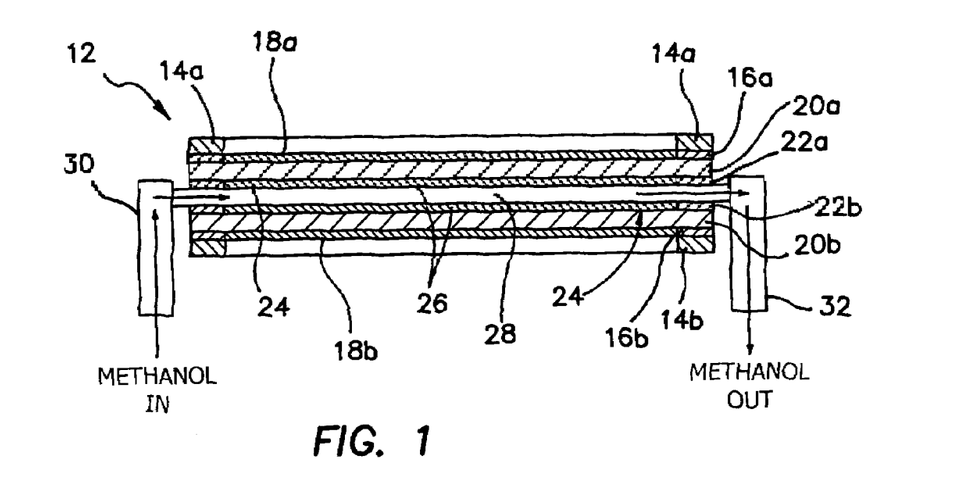
FIG. 1 is a cross-sectional side view of a single monopolar unit cell devised according to the invention.
Figure 5A:
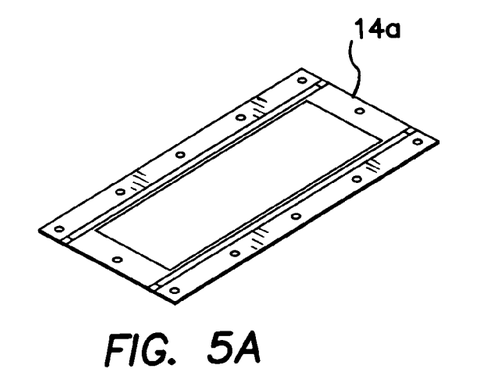
FIGS. 5a-5i are a series of perspective views illustrating the assembly of a single unit cell of the invention.
Figure 5B:
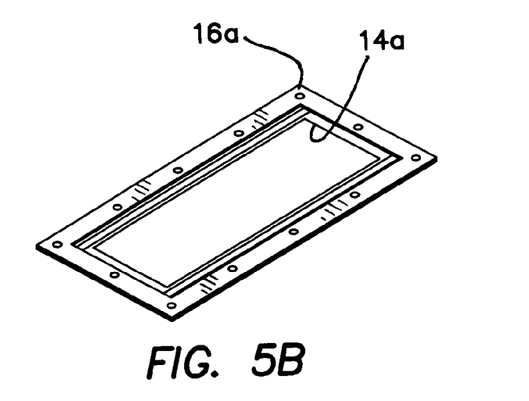

An "all-plastic" monopolar stack design is disclosed. By departing from the bipolar design, such a design eliminates biplates and end plates entirely and is particularly suitable for power output of less than 20 Watts. The stack 10 is assembled from individual "sealed unit cells" 12 as shown in cross-sectional side view in FIG. 1 that are comprised of two back-to-back sealed fuel cells sharing a common anode. A single unit cell 12 as shown in FIG. 1 is comprised of a first cathode plate 14a, which is a conductive frame used as an electrical cathode terminal and which provides mechanical strength and integrity to the unit cell 12 and is shown in perspective view in FIG. 5a. First cathode plate 14a includes a first planar cathode 18a which is exposed to air or oxygen and forms the exterior skin of unit cell 12. First cathode plate 14a is disposed underneath or adjacent to a first gasket 16a as shown in the perspective view of FIG. 5b.

Figures 5C, 5D:
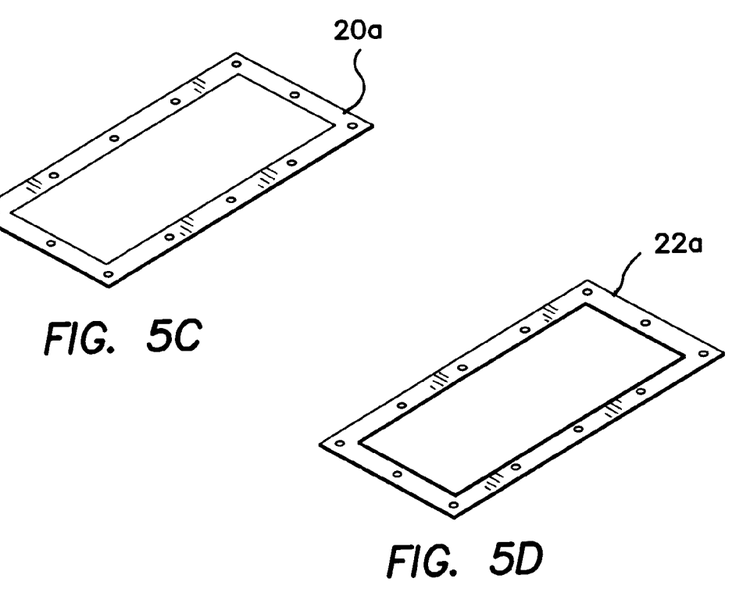

A first membrane electrode assembly 20a is disposed on top of or adjacent to a first gasket 16a and first cathode 18a as shown in the perspective view of FIG. 5c. Membrane electrode assembly 20a is preferably of the type described in U.S. Pat. Nos. 6,303,244, 5,599,638, and/or 6,485,851, but may include any type of membrane electrode assembly now known or later devised. A second gasket 22a is disposed on top of or adjacent to first membrane electrode assembly 20a as shown in the perspective view of FIG. 5d.

Figure 5E:
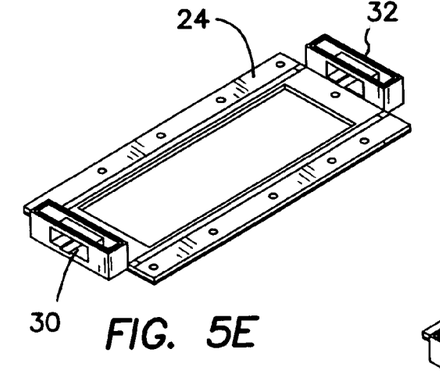

The shared or common anode assembly 24 is then disposed on top of or adjacent to first membrane electrode assembly 20a and gasket 22a as shown in the perspective view of FIG. 5e. Anode assembly 24 is preferably molded or made in the most part from plastic and includes a conductive planar anode 26 on each side of a central channel 28 defined within anode assembly 24. On the extreme left and right ends of anode assembly 24 as shown in FIG. 1 is a plastic inlet manifold 30 and a plastic outlet manifold 32. Inlet and outlet manifolds 30 and 32 may be integrally molded with the body of anode assembly 24 or may be welded or glued to it separately. Methanol or another fuel enters inlet manifold 30, flows into channel 28 in intimate contact with anode 26 on each side of channel 28 and flows out of outlet manifold 32 with such other byproducts which may be produced during the operation of unit cell 12.

Inlet and outlet manifolds 30 and 32 are designed so that they can snap fit or otherwise be readily coupled to adjacent inlet and outlet manifolds 30 and 32 respectively provided on the adjacent unit cell 12 in stack 10 as will be described in connection with FIG. 2 below. Any type of coupling now known or later devised may be employed to facilitate the combination of adjacent inlet and outlet manifolds 30 and 32. In the illustrated embodiment, inlet and outlet manifolds 30 and 32 are provided with orifices and sealing edges thereto (not shown) that seal and fit together using a conventional zip-lock or tongue-in-groove pressure or interference fit. The manner in which one manifold 30 or 32 couples to another to form a common inlet or outlet manifold is not material to the invention. One embodiment may include mating zip-lock orifices at the top and bottom of each manifold 30 or 32 with the topmost and bottom most manifold having an orifice sealed with a zip-lock panel or cover.

Figure 5F:
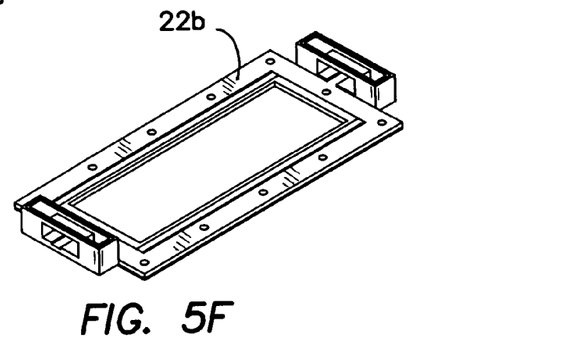
Figure 5G:
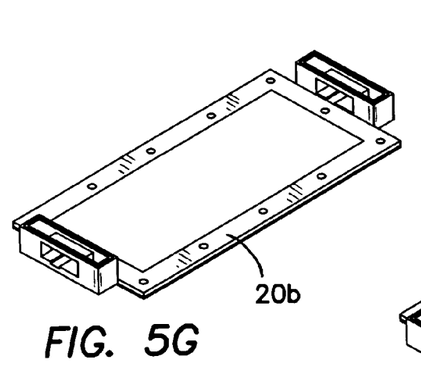
Figure 5H:
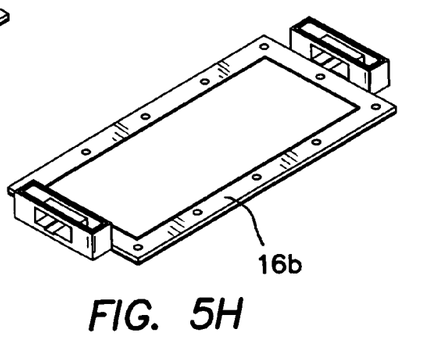
Figure 5I:
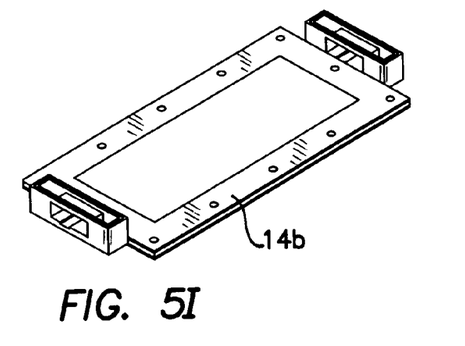
Figure 6:
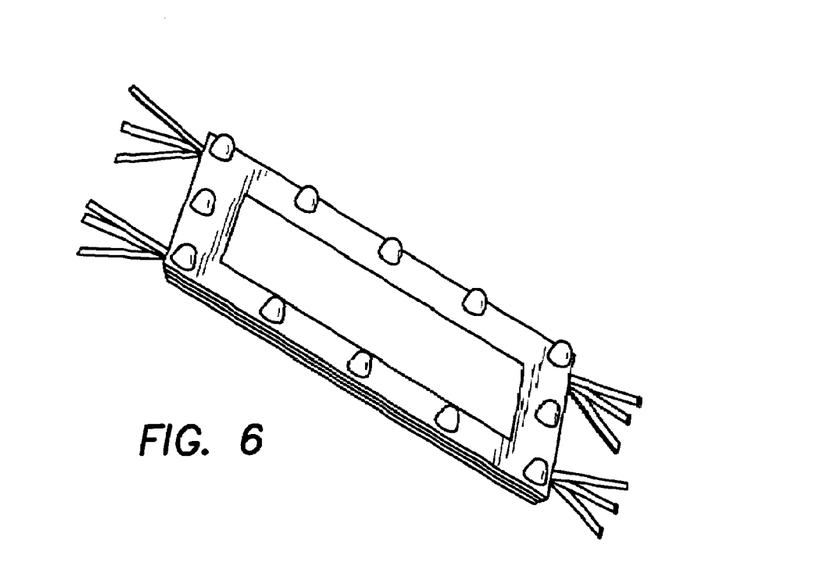
FIG. 6 is a photograph of an assembled unit cell of the invention.

Continuing with the structure of unit cell 12 as assembled as shown in FIGS. 5a-6i, a third gasket 22b is disposed on top of or adjacent to anode assembly 24 as shown in the perspective view of FIG. 5f. A second membrane electrode assembly 20b is disposed on top of or adjacent to gasket 22b and anode 26 as shown in the perspective view of FIG. 5g. A fourth gasket 16b is disposed on top of or adjacent to second membrane electrode assembly 20b as shown in the perspective view of FIG. 5h. Finally, a second cathode plate 14b including a second cathode 18b is disposed on top of or adjacent to gasket 16b and second membrane electrode assembly 20b as shown in the perspective view of FIG. 5i. The entire unit cell 12 is then bolted together along it periphery by a plurality of nuts and bolts as shown in the photograph of FIG. 6 to form an integral, sealed unit.

Figures 4A, 4B, 4C, 4D:
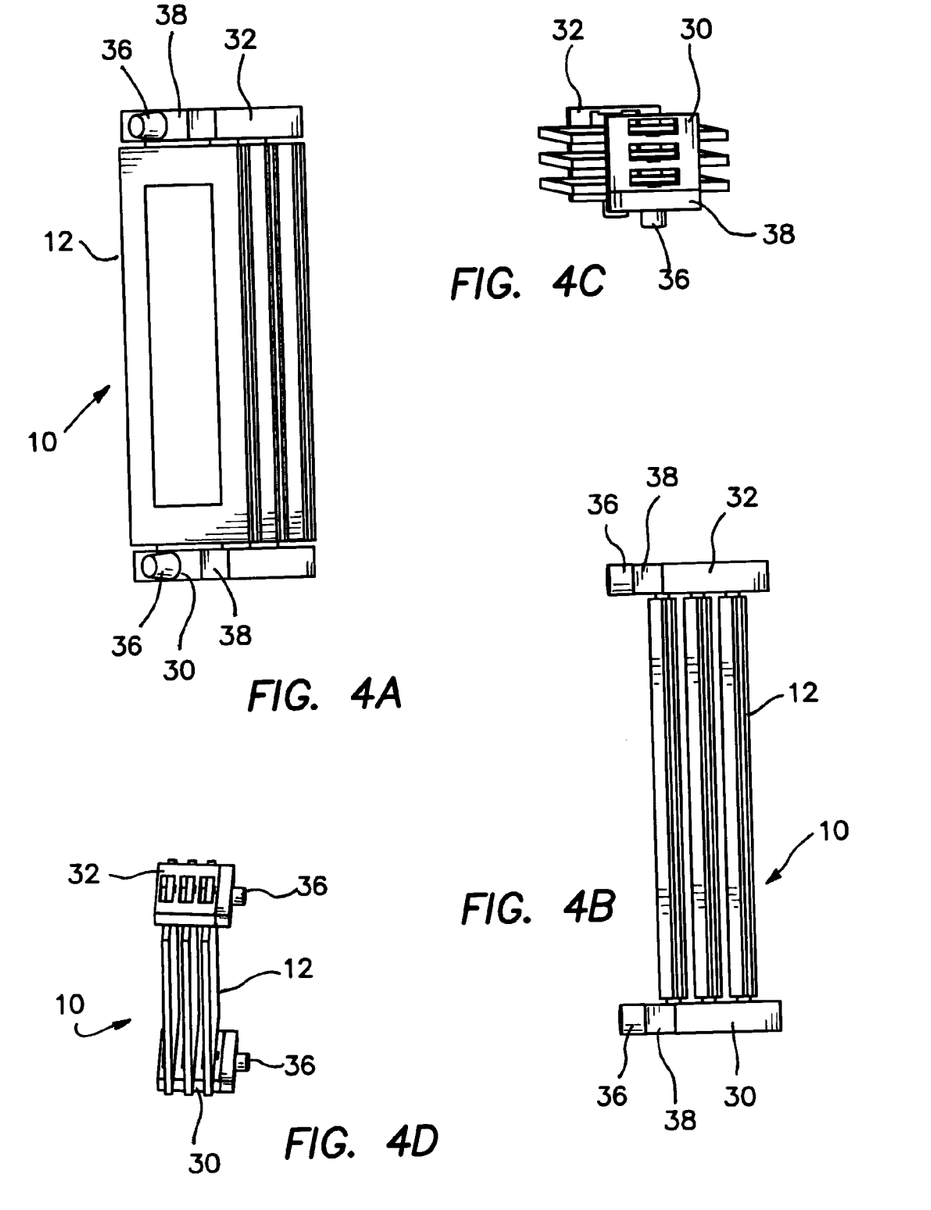
FIGS. 4a-4d are different perspective views of the assembled stack according to the invention.

Such individual "sealed unit cells" 12 are separately assembled and tested and then stacked, coupled or snapped together as shown in FIG. 2. FIG. 2 is a cross-sectional side view of three unit cells 12 assembled together. The vertical extend of manifolds 30 and 32, which in the illustrated embodiment are prismatic in shape, is such that an air channel 34 is defined between adjacent unit cell 12 through air or oxygen can flow or be forced. FIG. 4a is a three-quarter perspective view of three unit cells 12 showing connection to the top most manifolds 30 and 32 of a header 38 and pipe fitting 36. Multiple manifolds 30a and 32 then combine to form a common manifold for stack 10 as best shown in the side view of FIG. 4b, and the end perspective views of FIGS. 4c and 4d. The actual form and topology of manifolds 30 and 32 may assume any design now known or later devised.

By snapping together these individual sealed plastic units 12 to form a seal similar to a "zip loc" type of arrangement, a stack 10 can be easily assembled, disassembled and reassembled. If for any reason on unit cell 12 needs to be serviced or replaced, this can be performed quickly without special tools. Since no pressure is used to hold the many sealed unit cells 12 that constitute the stack 10, the stack 10 can be easily disassembled and individual sealed unit cells can be replaced.

Figure 3:
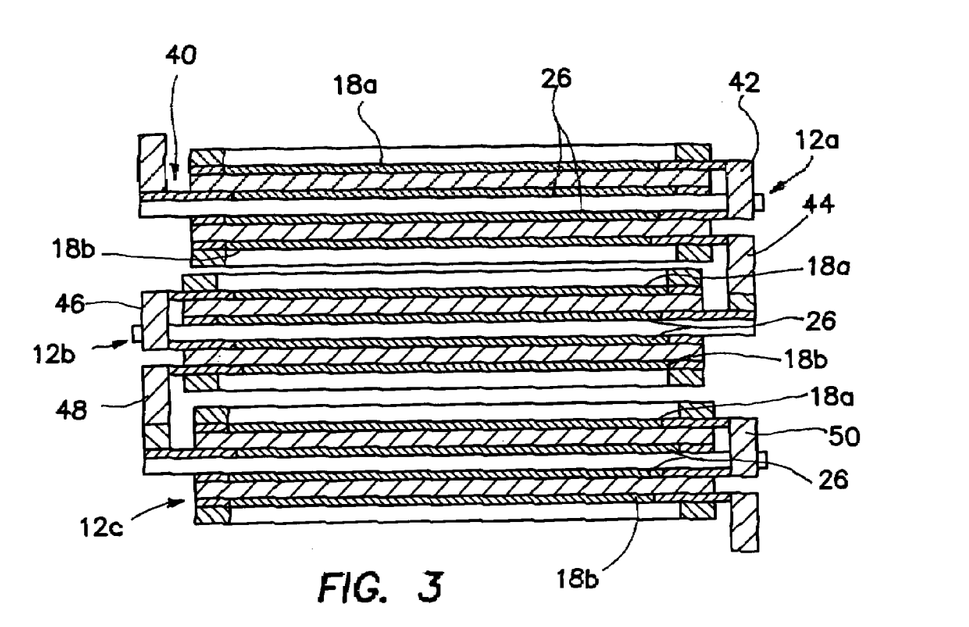
FIG. 3 is a cross-sectional side view of a three monopolar unit cells electrically connected as a stack according to the invention.

A current collector 40 is included as part of the anode 26 and cathode plate surfaces 18a and 18b touching each of the electrodes as shown in the cross-sectional side view of FIG. 3. The extension of these current collectors 40 are then appropriately connected to obtain the desired voltage and current. For example, connector 42 couples cathode 18a to anode 26 in unit cell 12a. Cathode 18b of unit 12a is coupled to anode 26 of unit cell 12b by connector 44. Cathode 18a of unit 12b is coupled to anode 26 of unit cell 12b by connector 46. Cathode 18b of unit 12b is coupled to anode 26 of unit cell 12c by connector 48. Cathode 18a of unit 12c is coupled to anode 26 of unit cell 12c by connector 50. Thus, by means of the serpentine arrangement of current collectors a series connection of the anodes and cathodes in cells 12a-12c is provided. Other types of electrical connections between cells 12a-12c can also be provided by modifications according to conventional design principles.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A monopolar fuel cell stack comprising a plurality of sealed unit cells couple together in a rigid assembly without use of top or bottom cover plates or tie rods, each unit cell comprising:

a first cathode;

a first membrane assembly disposed adjacent to the first cathode;

an anode plate disposed adjacent to the first membrane assembly, the anode plate having an anode and an internal channel defined therein for flow of fuel through the anode plate;

an inlet manifold coupled to the anode plate and communicating with the channel within the anode plate;

an outlet manifold coupled to the anode plate and communicating with the channel within the anode plate, the fuel flowing from the inlet manifold through the channel in contact with the anode plate and flowing out through the outlet manifold;

a second membrane assembly disposed adjacent to the anode plate; and a second cathode disposed adjacent to the second membrane assembly, wherein the inlet and outlet manifolds of each unit cell are arranged and configured to rigidly connect to the inlet and outlet manifolds respectively of an adjacent one of the plurality of unit cells to define a common inlet manifold comprised of all of the inlet manifolds of the plurality of the unit cells when the unit cells are coupled together and to space the unit cells apart from each other in an open stack to expose the cathodes and first and second membrane assemblies to oxygen or air, and to define a common outlet manifold comprised of all of the outlet manifolds of the unit cells when coupled together in the open stack, the rigid connection of the inlet and outlet manifolds of each unit cell to the inlet and outlet manifolds of an adjacent unit cell fixing the plurality of unit cells into the open stack as the sole means for retaining the open stack in the rigid assembly.

2. The stack of claim 1 wherein the first and second cathode are included as part of a corresponding first and second cathode plate.

3. The stack of claim 1 where each of the inlet and outlet manifolds are arranged and configured to snap fit into adjacent inlet and outlet manifolds respectively to provide a common inlet and outlet manifold for the stack for the plurality of unit cells.

4. The stack of claim 3 where the snap fit comprises a tongue-in-groove interference fit.

5. The stack of claim 3 further comprising an inlet and outlet header coupled to the common inlet and outlet manifold for the stack for the plurality of unit cells.

6. The stack of claim 1 further comprising a current collector for electrically connecting the anodes of the anode plate with the cathodes in a predetermined connection topology.

7. The stack of claim 1 further comprising sealing gaskets between the first and second cathode plates and the first and second membrane electrode assemblies, and further between the first and second membrane electrode assemblies and the anode plate.

* * * * *

UNITED STATES PATENT AND TRADEMARK OFFICE
CERTIFICATE OF CORRECTION

PATENT NO. : 7,585,577 B2 Page 1 of 1
APPLICATION NO. : 10/410761
DATED : September 8, 2009
INVENTOR(S) : Narayanan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1523 days.

Signed and Sealed this

Fourteenth Day of September, 2010

David J. Kappos
*Director of the United States Patent and Trademark Office*